May 7, 1957 S. LISTON 2,791,405
CONTINUOUS AUTOMATIC DOUGH MAKING MEANS
Filed May 24, 1954 7 Sheets-Sheet 1

INVENTOR.
SOL LISTON
BY H. S. Hendry
ATTORNEY

May 7, 1957 S. LISTON 2,791,405
CONTINUOUS AUTOMATIC DOUGH MAKING MEANS
Filed May 24, 1954 7 Sheets-Sheet 2

Fig. 3ᴬ

INVENTOR
SOL LISTON
BY H.S. Hendry
ATTORNEY

May 7, 1957  S. LISTON  2,791,405
CONTINUOUS AUTOMATIC DOUGH MAKING MEANS
Filed May 24, 1954  7 Sheets-Sheet 6

INVENTOR
SOL LISTON
BY H.S. Hendy
ATTORNEY

May 7, 1957    S. LISTON    2,791,405
CONTINUOUS AUTOMATIC DOUGH MAKING MEANS
Filed May 24, 1954    7 Sheets-Sheet 7
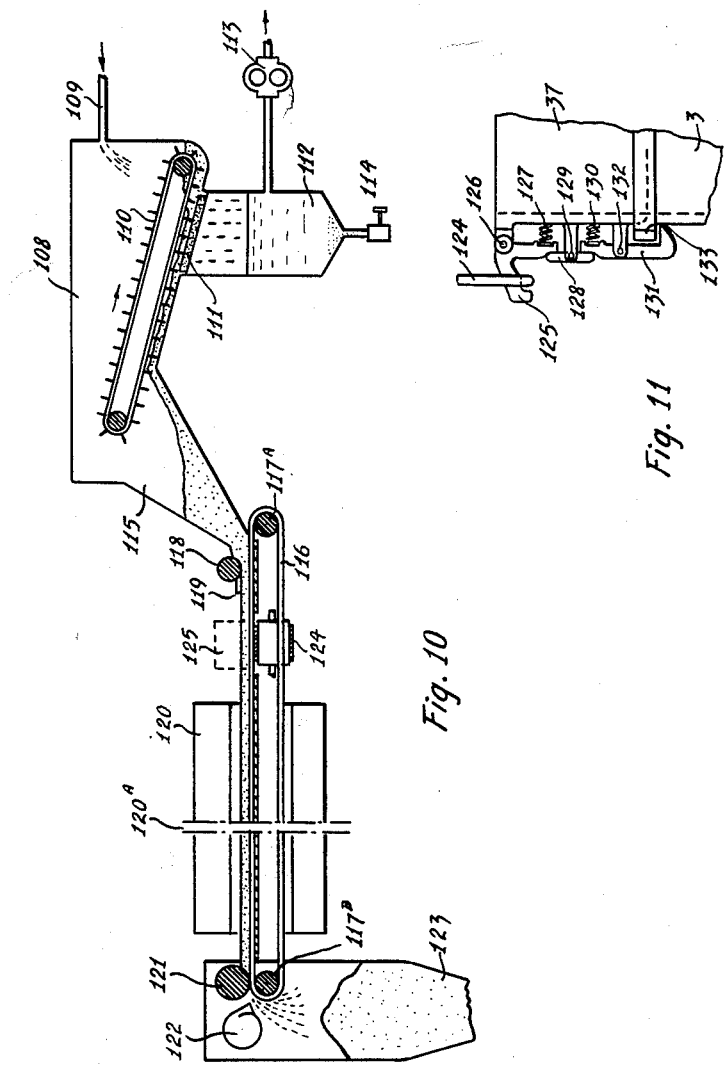
INVENTOR
SOL LISTON
BY H.S. Hendry
ATTORNEY

United States Patent Office 2,791,405
Patented May 7, 1957

2,791,405

CONTINUOUS AUTOMATIC DOUGH MAKING MEANS

Sol Liston, St. Kilda, Victoria, Australia

Application May 24, 1954, Serial No. 431,975

5 Claims. (Cl. 259—54)

This invention relates to continuous automatic means for carrying out various operations in the making of all kinds and varieties of unfermented, fermented and artificially leavened doughs made from flour or meal with water or whole milk, skimmed milk, buttermilk or whey, or with their equivalents in dry solids or with the prefermented liquors of the above mentioned substances.

All these different dough compositions will in this specification and for reason of simplification, bear the designation "milk gluten doughs" in contrast to "water dough," that is to say, doughs made from wheaten flour or wheaten meal with water only.

The means of the present invention also render possible the automatic extraction of the glutens of such doughs, and consequently to the separated different varieties of starch slurries and starches, as the result of the extraction of glutens from the different varieties of doughs.

An object of this invention is to provide automatic means for the supply of flours or meals and liquors, gases and yeast foods to the dough mixing bowls, but these liquors, gases and yeast and yeast food-chemicals are first emulsified in an emulsifier together with the liquor, and the proper quantity is then ejected into the flour or meal already in the mixing bowl.

Another object is to transfer wet glutens from the mixing bowls to their respective hoppers, for the wet-scalding or canning plant, or alternatively to a dehydration plant, for final treatment and shipping.

Another object is the piping off of the starch slurry to the starch extraction plants for dehydration and milling.

Another object is to convey wet starch slabs to another collection point for the manufacture of glucose or other starch products, or to kettles for boiling into starch syrup.

I attain all these objects by mechanical means as illustrated in the accompanying drawings, wherein like numerals of reference indicate corresponding parts in the various figures.

Figure 3A shows details of the bowl carrying mechanism;

Figure 10 is a sectional elevation on line 6—6 in Figure 5; and

Figure 11 is a fragmentary side elevation of the automatic locking device for the extension rings of the dough making bowls.

Figure 4:
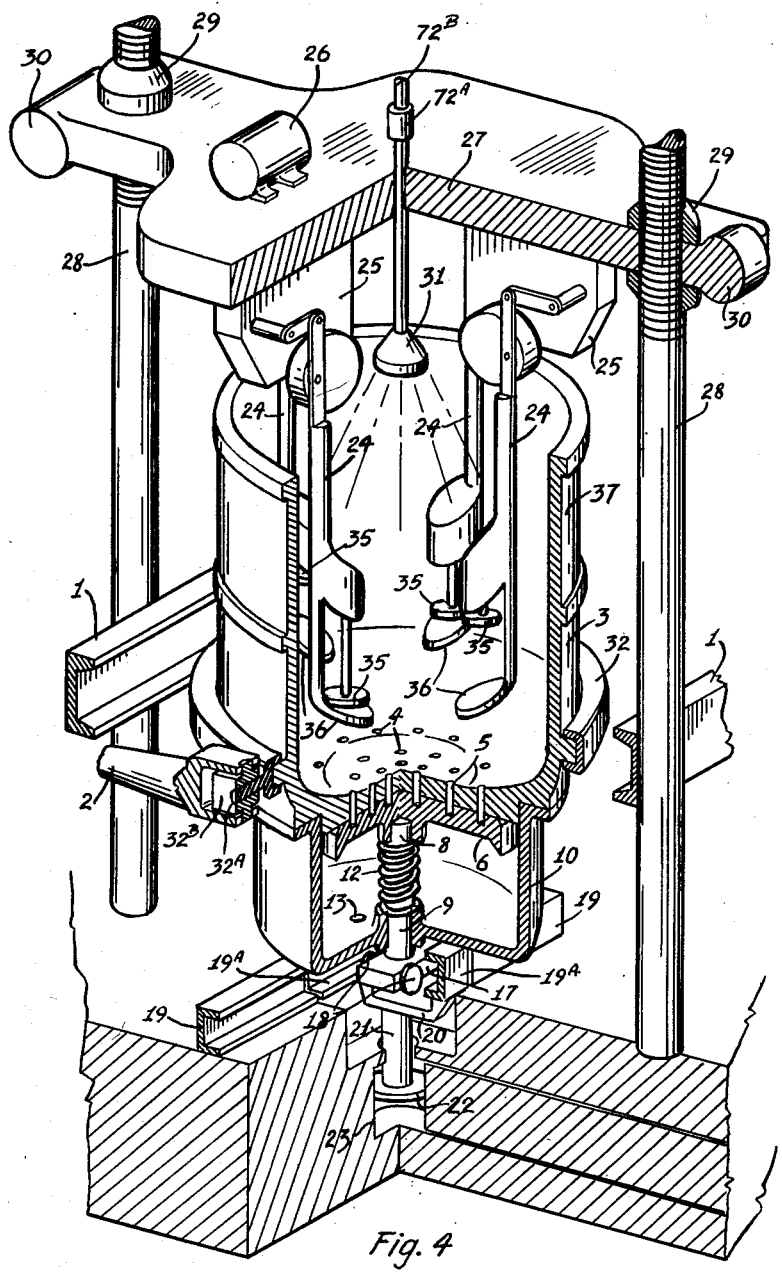
Figure 4 is a cut-away perspective view of a dough-mixing bowl, showing mixing arms and other details.
Figure 6:
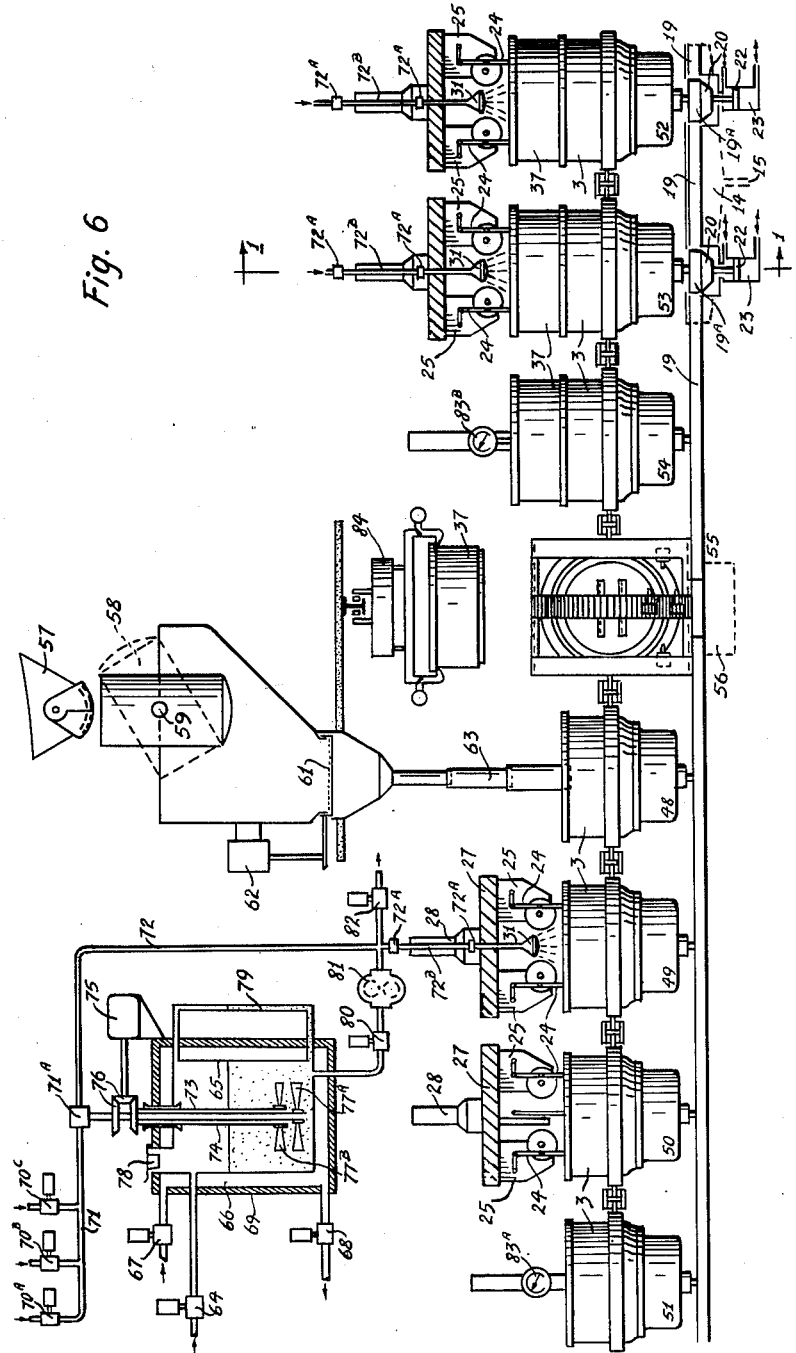
Figure 6 is an elevation of the dough making and gluten recovery plant.

Dough making is carried out as illustrated in Figures 4 and 6 of my drawings, i. e., station 49 in Figure 6 is for the making of plain dough only, the additions being added on station 50 as outlined in my Canadian application Serial Number 648,996.

Figure 1:
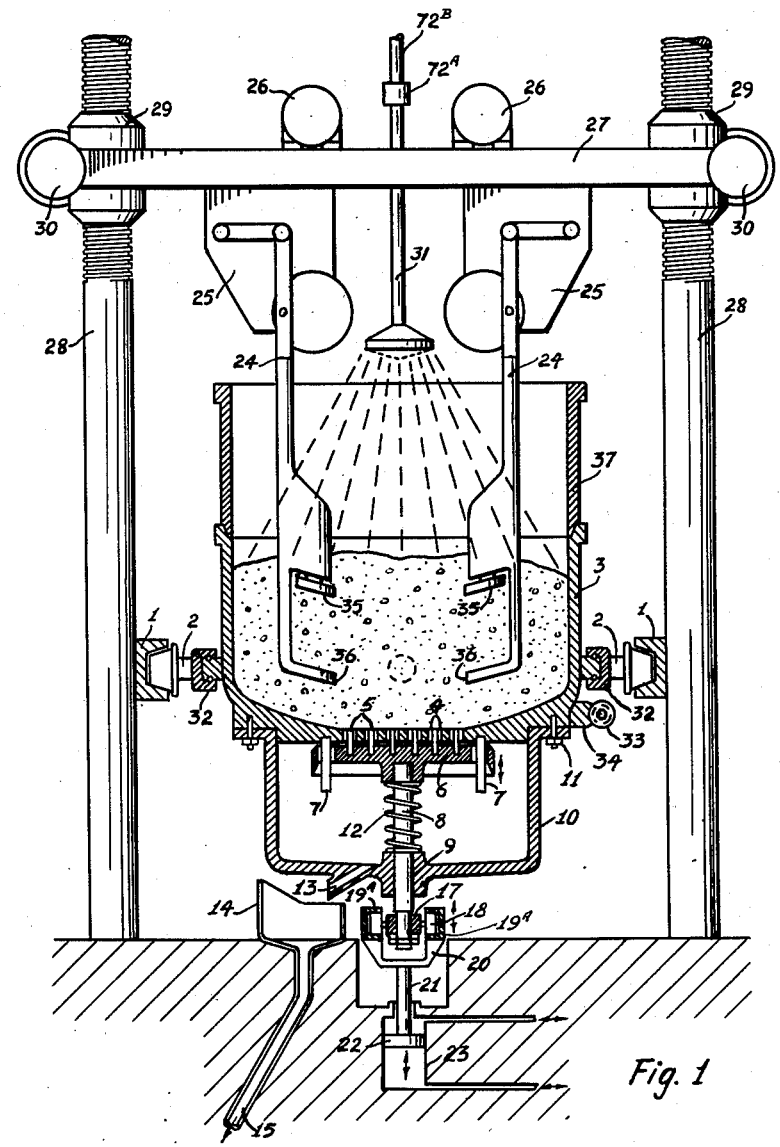
Figure 1 is a vertical section through one of the dough mixing bowls, with its supporting assembly.
Figure 5:
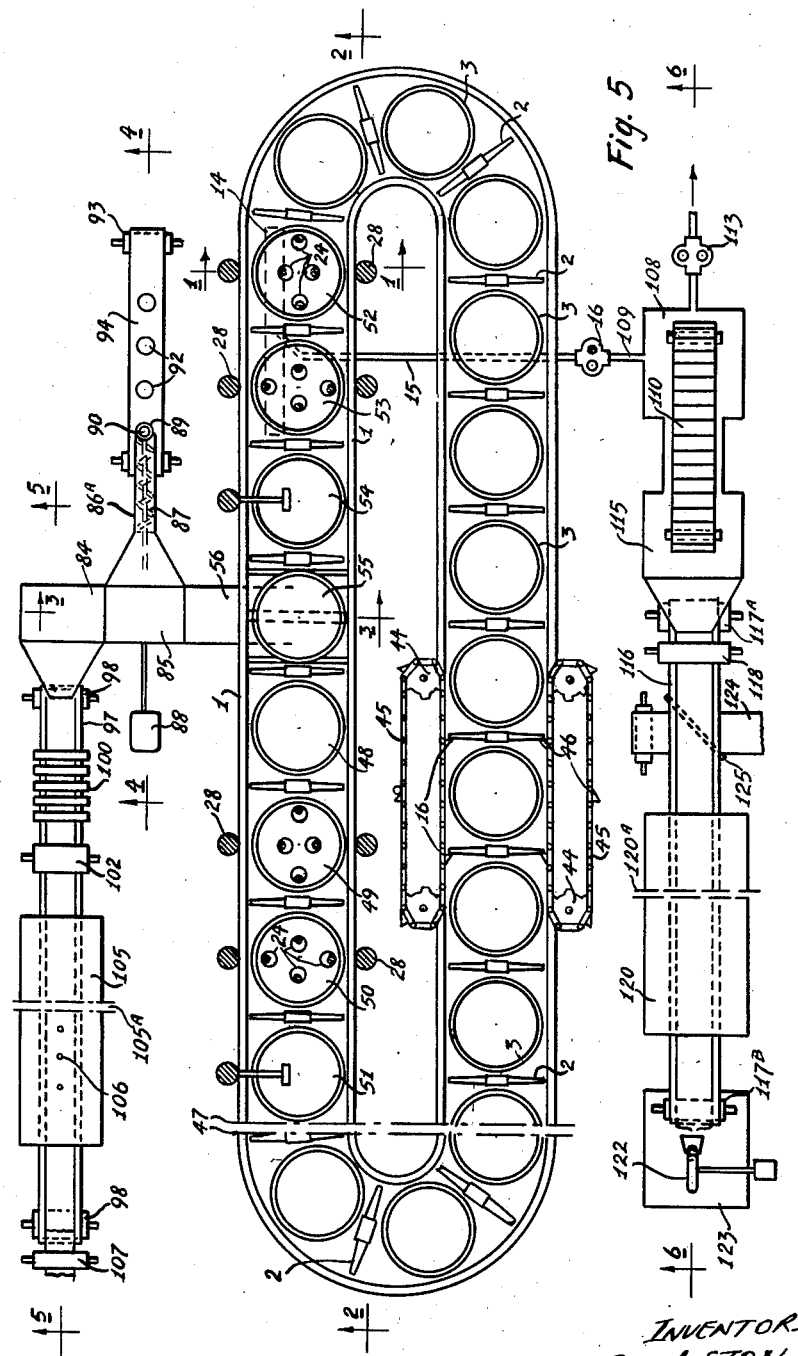
Figure 5 is a plan of the general layout.

Referring to the drawings, in Figure 1: 1 are top runners, 2 the bowl carrier, 3 the mixing bowls, 4 the perforated bottom of the mixing bowl, 5 the sealing pistons, 6 the reciprocating plate, 7 the guide pins (seen in guideways of the reciprocating plate), 8 the supporting arm, 9 the slideway centered in 10, which is the supporting casting, 11 are the bolts, 12 the spring attached around the supporting arms, 13 the starch slurry outlet, 14 the gutter with which is the pipe leading to the collection point which includes the pump 16 (as shown in Figure 5), 17 is the carriage, free to rotate about the arm 8, fitted with carriage wheels 18, running in bottom runners 19 and held by yoke 20. The rod 21 which is connected to piston 22 is reciprocated pneumatically in cylinder 23.

During the process of dough making, or the washing out of the glutens, parallel to the separation of the starch in the slurry, and during the spraying of liquor through the funnel 31 onto the dough in the bowl 3, the kneading arms 24 are operated by drive mechanism 25, which is driven by motors 26 (in Figure 1, only 2 leading arcs 24 are visible, but in Figure 4, all four are shown in working position).

Two motors 26 are mounted on bridge member 27, which is carried by two threaded pillars 28 so that motor-operated nuts 29 are engaging the thread on pillars 28 when activated. Two motors 30 drive the motor-operated nuts 29 and thus raise the bridge member 27.

Figure 3:
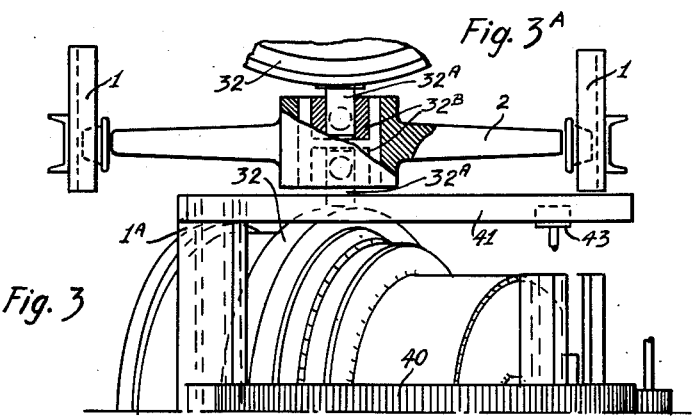
Figure 3 is a plan (in part) of a dough mixing bowl in tipping position.

In order to allow the bridge member 27 to be raised or lowered without interrupting the flow of liquor to funnel 31, a flexible connecting pipe may be of a type preferably similar to the rubber hoses well known in the wine and brewing industry. The spray funnel 31 is attached to the bridge member 27. During dough mixing and kneading, and during gluten washing out and parallel working starch separation, bowl 3 reciprocates part of a turn about a vertical axis in bearing 32, which is attached to bowl carrier 2 (as shown in Figure 3). This rotation is produced by worm 33, engaging a halfworm wheel 34 which is a part of bowls 3.

The dough kneading is duly assisted by kneading claws 35, pneumatically driven against the kneading arm extensions 36, so as to reproduce thoroughly the kneading effect and the moisture pressing out effect on the dough in the rotating bowl 3.

Extension rings 37 for bowls 3 are provided to guard against spillage during the doughmaking, high top fermentation and gluten washing out operations.

Figure 2:
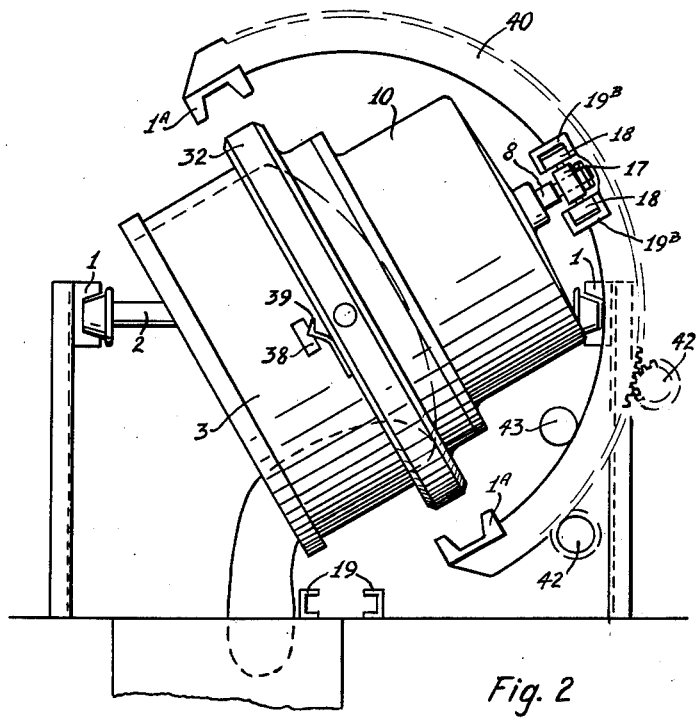
Figure 2 is a side elevation of a dough mixing bowl in a tipping position, part of the supporting mechanism being shown in dot and dash lines.

Before tipping (see Figure 2), the bowl 3 is rotated until the locating spring 39, which is attached to bearing 32, engages notch 38, which is mounted on the bowls 3.

Tipping is produced by gears 42 engaging cradle rack 40, rotating, and thereby rotating the cradle into the desired position limited by a stop (not shown in the drawing); such stop may be governed by electrical power. The cradle rack 40 carries two top runners, section 1A, to which are attached the half-rings 41. Guide rollers 43 restrain these half-rings. Restoring the bowls 3 back into basic position is done by reversing the mechanism.

Figure 3A also shows in detail the bowl carrier 2. Bearing ring 32 has an extension pin 32A which engages in vertically pivoted bearing 32B. The bearings in turn engage the bowl carrier 2. Pins 32A are restrained from any longitudinal movement in bearings 32B by means of suitable end caps or any similar devices well known to machine designers. They are omitted in the drawings of Figures 3A and 4 for the sake of clarity. This construction allows the bowls to be carried around curved portions of the top runner 1 while also permitting the tipping of the bowls 3 wherever required.

In Figure 4, all members and reference lines conform to those shown in Figure 1, except that the guide pins 7, bolts 11, gutter 14, pipe 15, pump 16, worm 33, and halfworm 34, are not shown.

Figure 1 shows only two dough kneading arms 24, but in Figure 4 all four arms are shown, and it can be clearly seen how the kneading effect is applied: this can be done even if extension ring 37 is attached to bowl 3, but for the sake of convenience should be taken off during dough making. During the gluten washing out stations 52 and 53, the extension rings 37 should be left on the bowls 3 to prevent spillage of dough, wet gluten or spray liquor. During the dough making and addition to the doughs on stations 49 and 50, respectively (Figure 5), the bottom holes 4 of bowls 3 are sealed by sealing pistons 5, to prevent escape of liquor destined for the dough as proper moisture content.

Figure 5 is a plan of general plant layout. Top runners 1 form an endless track which may be made up of partly straight, partly circular sections, but if desired this endless track can be laid out in a full circle, according to the understructure of the bowl carrier 2. These top runners 1 support the bowl carrier 2, which in turn carry the mixing bowl 3. This system is driven preferably by sprocket wheels 44, which in turn carry caterpillar chains 45. These caterpillar chains have projections 46 which engage with the bowl carrier 2. The break 47 is shown to indicate whether the number of the bowls 3 (of which 21 are shown in Figure 5) has to be increased—the size of the system will have to be increased accordingly.

Mixing bowl 3 in position 48 allows the loading of flour or meal, as previously explained. Positions 49 and 50 are dough making stations.

The changes in the dough are at full strength about the fourth hour after dough making, and at this time the first of 21 doughs in bowls 3 appear in position 52, and after a further 15 minutes on position 53. These are the gluten washing out stations. By action of the kneading arms 24 assisted by plenty of spray liquor delivered through the funnel 31 into the bowls, the starch content of the dough is reduced to a predetermined degree. The starch slurry runs off as shown in the drawing of the lower right hand portion of Figure 6. After this treatment of 15 minutes, the starch-reduced dough moves to station 53, starts again with yeast production, to be moved to station 54 after a further 15 minutes. Such starch-reduced dough can be enriched with wet milk gluten on station 53, and if so desired, a yeast sponge can also be added to force quicker fermentation.

Figure 7:
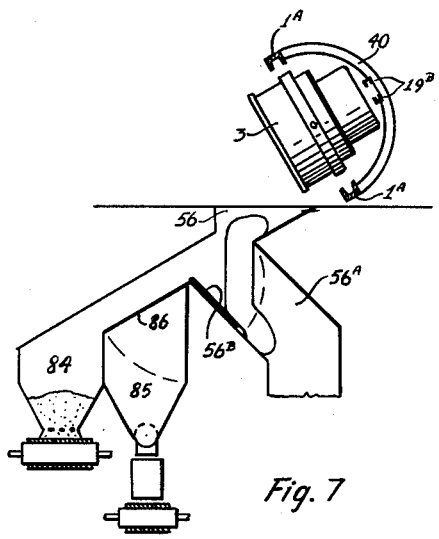
Figure 7 is a sectional elevation on line 3—3 in Figure 5.
Figure 8:
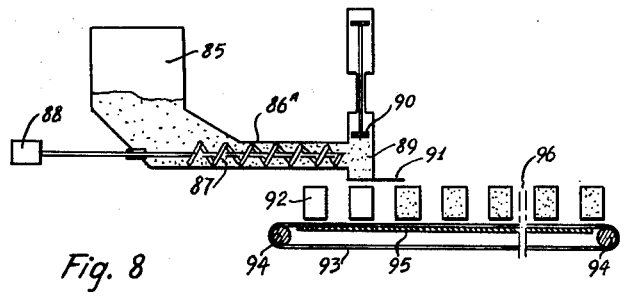
Figure 8 is a sectional elevation on line 4—4 in Figure 5.

The starch reduced and wet milk gluten, etc., enriched dough moves from station 53 to station 54, which is the control station 83B. Here 15 minutes is consumed for control of gas development, after which time the dough will be transferred to station 55 and thereafter to hopper 56 as shown in Figure 7, or through hopper 56 to the make-up plants as shown in hopper 56A. Substantially, as shown in Figure 5, are the plans of the wet gluten scalding and canning process, the sectional elevation 4—4 of which is shown in Figure 8, and also the casein-yeast compound scalding and canning process station, the wet gluten and the casein yeast compound drying, de-vitalizing and breaking up process station (sectional elevation 5—5, see Figure 9), the starch slurry filtering, conveying, dehydration and powdering process station (sectional elevation 6—6, see Figure 10), and alternatively, the starch content reduced starch slurry as shown in container 112 of Figure 10, pumped through pumps 113 back into the circulation system, or piped away for other purposes; finally, the piping away of the slurry, reduced in starch content to the kettles (not shown) in which this slurry reduced starch content is boiled to a thin starch syrup to be later combined with one or the other of the milk varieties or whey, in the fermentation vats.

At station 48, flour from bulk stove 5 is measured by means of a tumbling cylinder 58, rotating about axis 59 into hopper 60. From this hopper 60 the flour is drawn by suction through vibrating sieve 61, operated by motor 62 (the suction system is not shown in the drawings). Then the flour and/or meal or any dry premix is delivered by way of a telescopic chute 63 into bowl 3. The telescopic chute is shown in full extension and can be automatically retracted when the sieving process is completed. At station 49 a prepared liquor is added to the flour. The liquor enters through the solenoid valve 64 into the emulsifier 65 which also acts as a metering tank. All liquors are piped through the emulsifier jacket 66. This jacket may act as a heating or cooling appliance. It is fed through inlet valve 67 and emptied through outlet valve 68. A layer of insulation material surrounds the jacket.

Valves 70A—70B—70C are feeding carbon dioxide and oxygen or steam into the manifold 71, from which these gases can be piped through the two-way valve 71A into the emulsifier 65, or directly through pipe 72, and spray funnels 31, into the bowls 3 to mix quickly with the dough during the dough kneading. As already mentioned, a flexible connecting hose 72B fitted at each end with unions 72A is an added part to pipe 72 in order to allow the raising and lowering of bridge member 27 without interrupting the liquor supply during dough making on station 49 or during the gluten washing out or dough starch reducing process on stations 52 and 53, or for starch reduced doughs, respectively.

If the aforenamed gases are piped into emulsifier 65 or through spray funnel 31 directly into bowls 3, they are entering through the hollow shaft 73 which is situated inside another hollow shaft 74. These shafts, driven by motor 75 and gears 76, rotate in opposite directions; they also carry agitating paddles 77a and 77b which agitate the emulsifier contents.

The trapdoor 78 is provided to allow additions as required and a gauge glass 79 indicates the height of liquor in the emulsifier 65.

An outlet valve 82 is also provided for cleaning the interior of the emulsifier 65, which is done with hot water and/or wet steam. These are obtained through valves 64 and 70 which paddles 74a and 77b are agitating the water during the cleaning process.

At any stage during the bulk fermentation of the dough in the bowls 3, extension rings 37 can be fitted by an overhead conveying and hoisting system 84, which is shown in Figure 6 in a position where the extension ring 37 is lifted off the mixing bowl 3. The hook 124 (Figure 11), part of lever 131, engages lip 133 of mixing bowls 3 (Figure 1), and thereby securely locks extension rings 37 onto mixing bowls 3. When hook 124, part of the hoist 84 (shown in Figure 6), tends to lift extension ring 37, lever 125 rotates about fulcrum 126 and operates lever 128 pivoting about fulcrum 129. Lever 128 depresses lever 131 which pivots about fulcrum 132, thereby disengaging its hook from lip 133 of mixing bowls 3. Thus the extension ring 37 is free to be raised. Springs 127 and 130 are so proportioned as to keep hook 131 under lips 133 when the extension ring 37 normally sits on mixing bowl 3. Alternatively: if a locking device as described above is not required, simple counter-weighted hooks can be used for smaller plants as shown at 84 in Figure 6.

At stations 52 and 53 shown at the right-hand side of Figure 6, washing out of the wet gluten starch takes place. Proper time for the process of gluten extractors is 30 minutes, i. e. 15 minutes on each station, because as mentioned previously all 21 bowls are moving intermittently at 15 minutes (if so regulated) in their orbit on the track runner 1; consequently, glutin washing out starts at station 52 and is completed at station 53.

The dough at station 55 is discharged into transit hopper 56. I am using the name transit hopper for making quite clear that this hopper leads to a series of hoppers—i. e., hopper 56 for transfer of dough to the bakehouse; hopper 84 for transfer of wet glutin to the scalding and canning plant; hopper 85 for transfer of the wet glutin to the dehydration plant. All doughs or wet glutens pass first through transit hopper 56.

The discharge of the wet glutins from station 55 as shown in Figure 5 is shown substantially in Figure 7. The tipping mechanism according to Figure 2 empties the contents of bowls 3 into transit hopper 56 when it can drop into hopper 84 or 85 by controlling trapdoor 86. If dropped into hopper 84, it leads to the wet gluten dehydration plant which is substantially shown in Figure 8. If the dough is dropped into hopper 56 for transfer down to the feeder of the scalding pocket divider in the make-up plant, the trapdoor 56B of transit hopper 56 opens automatically, as seen in Figure 7.

As seen in Figure 8, the wet gluten in hopper 85 is forced through tube 86A by the extrusion screw 87 driven by motor 88. The substance, a grey-to-creamy coloured, flexible rubbery and sticky mass, is thus forced into cylinder 89 which limits to any desired degree the volume of glutin for containers 92 which may be of different sizes. After the automatic withdrawal of the shutter 91 by intermittent synchronizing means (not shown), the pneumatically-operated piston 90 forces the contents of the cylinder 89 through the bottom of the cylinder into containers 92. These containers are placed on an intermittently moving belt 93, running around rollers 94 (one on each end of the belt) and supporting plate 95. The break at 96 indicates that the belt can be made of any desired and suitable length.

Figure 9:
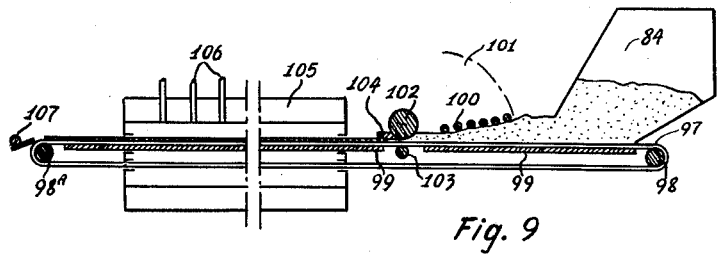
Figure 9 is a sectional elevation on line 5—5 in Figure 5.

In Figure 9, the wet glutin on hopper 84 as shown in Figure 7 flows onto belt 97 made of perforated stainless steel running around rollers 98 and 98A and is now conveyed under idle rollers 100 which can be lifted into a vertical position as shown at ARC 101 for cleaning purposes. The idle rollers perform the function of pre-sheeting the wet glutin which is then finally sheeted in any desired thickness between rollers 102 and 103 and scraped off roller 102 with scraper 104 so positioned as to prevent any clogging and fouling of the mechanism. The wet glutin now lying evenly sheeted on the belt conveyor 97 enters the temperature-controlled tunnel oven 105 of any desired length, where it is dehydrated, passing slowly by, by heat and vacuum means 106. The dry glutin slabs are broken up into small fragments by action of the breaker roller 107 in pressure conjunction with conveyor belt roller 98A and drops into a receptacle or bin (not shown) to be passed to compact milling and milled to fine powder.

The starch slurry piped from gutter 14 through pipe 15 and pumps 16 as shown in Figures 1 and 5 enters into a collection receptacle 108 through pipe 109 and after filtering drops to the bottom of receptacle 108 to scraper conveyor 110, having scrapers of rubber or similar resilient material which moves continuously and forces the starch granules slowly past the filter screen 111. The milky starch water still containing finer starch particles runs off through filter screen 111 into container 112, whence it is pumped by pumps 113 into a circulation system (not shown). The heavier starch particles which settle in the apex of container 112 can be ejected through valve 114 and by any desired means be transferred to a starch separating centrifuge (not shown). This process of separating starch from liquid by centrifugal means is well known in the starch industry.

I claim:

1. In a continuous automatic dough making machine, the combination of an endless horizontal track; a plurality of interconnected carriages riding on said track; a mixing bowl mounted to each of said carriages for rotary movement in a vertical axis for mixing the dough, and for rotary movement on a horizontal axis to permit of the dumping of the dough; a rigid member depending from each of said mixing bowls; guide means in which the member rides for maintaining the mixing bowl in an upright position, said guide means being provided with a gap; a ring mounted for rotation in a plane transverse to said guide means and disposed to lie within said gap, said ring being provided with a gap presenting adjacent ends of a contour similar to that of said guide means so that said guide means and said ring provide an uninterrupted guide for the member; and means for rotating said ring to rotate said bowl from a vertical position for dumping the dough when the member lies between the adjacent ends of said ring.

2. In a continuous dough making machine of the kind described, the combination of an endless horizontal track; a plurality of interconnected carriages riding on said track; a mixing bowl mounted to each of said carriages for rotary movement in a vertical axis for mixing the dough, and for rotary movement on a horizontal axis to permit of the dumping of the dough, the bowl including a bottom formed with apertures; a closure spring-held against the lower face of said closure effectively to close the apertures; a member rigidly depending from the closure and having rollers adjacent the lower end thereof; guide means in which said rollers ride for maintaining the mixing bowl in an upright position, said guide means being provided with a gap therein; a second similar guide means positioned within said gap and forming with said first guide means an uninterrupted guide for said rollers; and means connected to said second guide means for lowering said closure effectively to open the apertures when said rollers lie between said second guide means.

3. In a continuous dough making machine, the combination of an endless horizontal track; a plurality of carriages riding on said track; a mixing bowl mounted to each of said carriages for rotary movement on a vertical axis for mixing the dough, and on a horizontal axis to permit of the dumping of the dough, said bowl including a bottom formed with apertures; a closure spring-held against the lower face of said bottom effectively to close the apertures; a member rigidly depending from said closure and having rollers adjacent the lower end thereof; guide means in which said rollers ride for maintaining said bowls in an upright position, said guide means being provided with two gaps therein; a ring mounted for rotation in a plane transverse to said guide means and disposed to be within one of said gaps, said ring being provided with a gap presenting adjacent ends of a contour similar to that of said guide means so that said guide means and said ring provide an uninterrupted guide for said rollers; means for rotating said ring to rotate said bowl from a vertical position for dumping the dough when said rollers lie between the adjacent ends of said ring; a second guide means positioned within the second of said gaps and forming with said first guide means an uninterrupted guide for said rollers; and means connected to said second guide means for lowering said closure effectively to open the apertures when said rollers lie within said second guide means.

4. A machine as in claim 1; including, beater arms depending into said bowls, supporting means for said arms, and means for bodily lowering and raising said arms.

5. A machine as in claim 1; including, supporting means, means for bodily raising and lowering said supporting means, a crank rotatable on said supporting means, a beater arm pivotally connected adjacent one end to said crank, and a crank turning on said supporting means and pivotally connected to said arm intermediate the length thereof.

References Cited in the file of this patent

UNITED STATES PATENTS

| | | |
|---|---|---|
| Re. 1,524 | Fitzgerald | Aug. 18, 1863 |
| 33,432 | Fitzgerald | Oct. 8, 1861 |
| 774,680 | Lynds | Nov. 6, 1904 |
| 1,790,347 | Hawkins | Jan. 27, 1931 |
| 1,919,878 | Brownlee | July 25, 1933 |
| 2,206,237 | Roberts | July 2, 1940 |

OTHER REFERENCES

Bakers Digest, volume 28, April 1954, pages 26 to 28, 34.

Bakers Weekly, August 2, 1954, pages 25 to 28.